United States Patent
Yu

(10) Patent No.: US 7,765,047 B2
(45) Date of Patent: Jul. 27, 2010

(54) SHIFT CONTROL METHOD OF AUTOMATIC TRANSMISSION

(75) Inventor: Pyung Hwan Yu, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 786 days.

(21) Appl. No.: 11/646,071

(22) Filed: Dec. 26, 2006

(65) Prior Publication Data

US 2007/0118267 A1    May 24, 2007

(30) Foreign Application Priority Data

Apr. 7, 2006    (KR) .................. 10-2006-0031900

(51) Int. Cl.
*G06F 7/00* (2006.01)

(52) U.S. Cl. .................. 701/57; 477/121; 477/125

(58) Field of Classification Search .................. 701/57, 701/51, 67, 58; 702/154; 477/43, 39, 121, 477/125; G06F 7/00
See application file for complete search history.

(56) References Cited

U.S. PATENT DOCUMENTS

| 5,021,958 | A * | 6/1991 | Tokoro ..................... 701/98 |
| 5,794,169 | A * | 8/1998 | Jung et al. .................. 701/57 |
| 6,169,949 | B1 * | 1/2001 | Sato ........................... 701/51 |
| 6,249,735 | B1 * | 6/2001 | Yamada et al. ............. 701/65 |
| 6,778,896 | B1 * | 8/2004 | Matsuura et al. ........... 701/70 |
| 7,041,031 | B2 * | 5/2006 | Wheeler et al. ............ 477/110 |
| 2001/0005805 | A1 * | 6/2001 | Saotome et al. ............ 701/67 |
| 2001/0044686 | A1 * | 11/2001 | Taniguchi et al. ........... 701/51 |
| 2002/0059824 | A1 * | 5/2002 | Ono et al. .................... 73/146 |
| 2003/0192375 | A1 * | 10/2003 | Sugai et al. ................. 73/146 |
| 2004/0014558 | A1 * | 1/2004 | Ibamoto et al. ............. 477/45 |
| 2004/0259683 | A1 * | 12/2004 | Katakura et al. ........... 477/111 |
| 2005/0124458 | A1 * | 6/2005 | Iwatsuki et al. ............. 477/34 |
| 2006/0185459 | A1 * | 8/2006 | Matsumura et al. ........ 74/335 |
| 2006/0219048 | A1 * | 10/2006 | Ueno .......................... 74/560 |
| 2006/0293825 | A1 * | 12/2006 | Sporl et al. ................. 701/93 |

FOREIGN PATENT DOCUMENTS

| JP | 2002235847 A | * | 8/2002 |
| JP | 2004100904 A | * | 4/2004 |

* cited by examiner

*Primary Examiner*—Tuan C To
(74) *Attorney, Agent, or Firm*—Morgan, Lewis & Bockius LLP

(57) ABSTRACT

A shift control method of an automatic transmission includes the steps of: determining whether a road has a gradient; calculating road gradient in real time; filtering the gradient; controlling shifting according to the greater of calculated and filtered gradients if the calculated gradient is negative; and controlling shifting according to the calculated gradient if the calculated gradient is positive.

8 Claims, 2 Drawing Sheets

SHIFT CONTROL METHOD OF AUTOMATIC TRANSMISSION

CROSS-REFERENCE TO RELATED APPLICATION

This application claims priority to and the benefit of Korean Patent Application No. 10-2006-0031900 filed in the Korean Intellectual Property Office on Apr. 7, 2006, the entire contents of which are incorporated herein by reference.

BACKGROUND OF THE INVENTION

1. Field of the Invention

The present invention relates to a shift control method of an automatic transmission and, more particularly, to a shift control method of an automatic transmission that prevents busy shifting on roads with severe gradient changes by filtering gradient of the road, which is calculated in real time, and controlling shifting according to the filtered gradient.

2. Description of the Related Art

In general, a shift pattern of a vehicle equipped with an automatic transmission is set according to a vehicle speed and an opening degree of a throttle valve, and the vehicle automatically shifts to a suitable gear according to its driving states based on the shift pattern.

Recently, in order to prevent up-shifting while the vehicle is going downhill, fuzzy logic has been used such that shifting is controlled depending on the gradient of the road.

However, such a shift control method has a problem in that if the vehicle is on a road with alternating uphill and downhill sections, the vehicle continuously down-shifts and up-shifts. This is referred to as "busy shifting." Busy shifting degrades driving comfort and fuel efficiency.

SUMMARY OF THE INVENTION

An exemplary embodiment of the present invention provides a shift control method of an automatic transmission including: a gradient determining step in which it is determined whether a road has a gradient; a gradient calculating step in which, if the road is determined to have a gradient, the gradient is calculated in real time; a gradient filtering step, in which the calculated gradient is filtered; and a first shift controlling step in which the calculated and filtered gradients are compared, and shifting is controlled according to the greater of the two gradients.

The first shift controlling step may take place only when the calculated gradient is negative.

The shift control method may further include a second shift controlling step, in which, if the calculated gradient is positive, shifting is controlled according to the calculated gradient.

The first shift controlling step may take place when the calculated gradient changes to negative after the second shift controlling step is performed.

In the gradient filtering step, a plurality of gradient values calculated during a certain time period may be averaged.

In the gradient calculating step, gradient may be calculated based on a difference between acceleration on a flat road and that on the gradient road.

The first shift controlling step may include inputting a throttle opening and a vehicle speed, and may utilize fuzzy logic that determines a shift pattern based on the greater of the calculated and filtered gradients, throttle opening, and vehicle speed.

The second shift controlling step may include inputting a throttle opening and a vehicle speed, and may utilize fuzzy logic that determines a shift pattern based on calculated gradient, throttle opening, and vehicle speed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Exemplary embodiments of the present invention will be described in detail with reference to the accompanying drawings.

Figure 1:
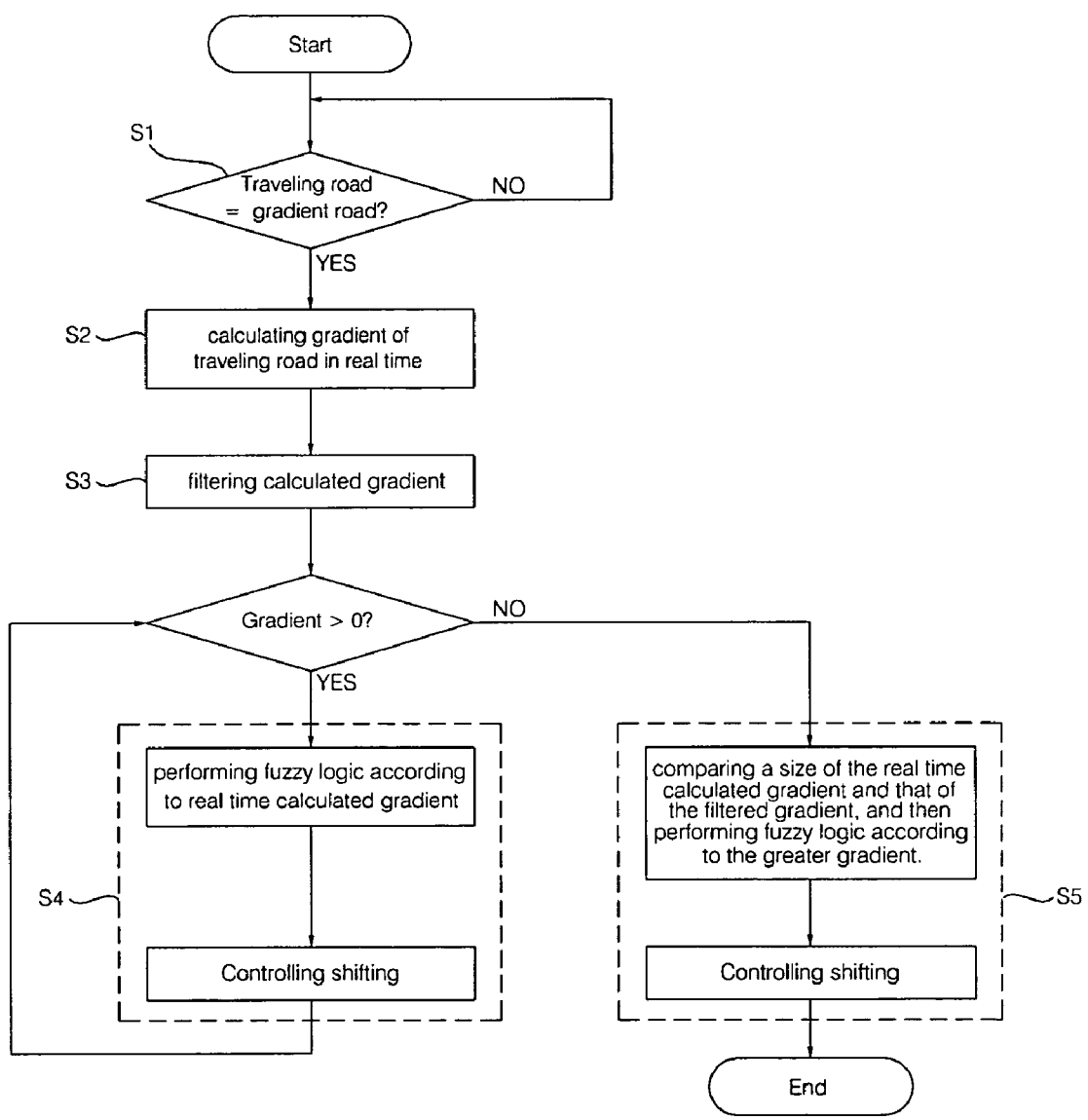
FIG. 1 is a flow chart illustrating an exemplary shift control method of an automatic transmission in accordance with the present invention.

As shown in FIG. 1, first, in a gradient determining step (S1), it is determined whether or not a road on which a vehicle is traveling has gradient. This can be determined based on a change in a throttle opening when the accelerator is depressed.

If the road is determined to have a gradient in step S1, a gradient calculating step (S2) takes place, in which gradient of the road is calculated in real time. Gradient can be calculated based on a difference between acceleration on a flat road and that on the gradient road.

A gradient filtering step (S3) then takes place, in which the calculated gradient is filtered. A plurality of gradient values that have been calculated during a certain time period may averaged to obtain one gradient. For example, the previous four gradient values calculated in the gradient calculating step may be averaged.

Figure 2:
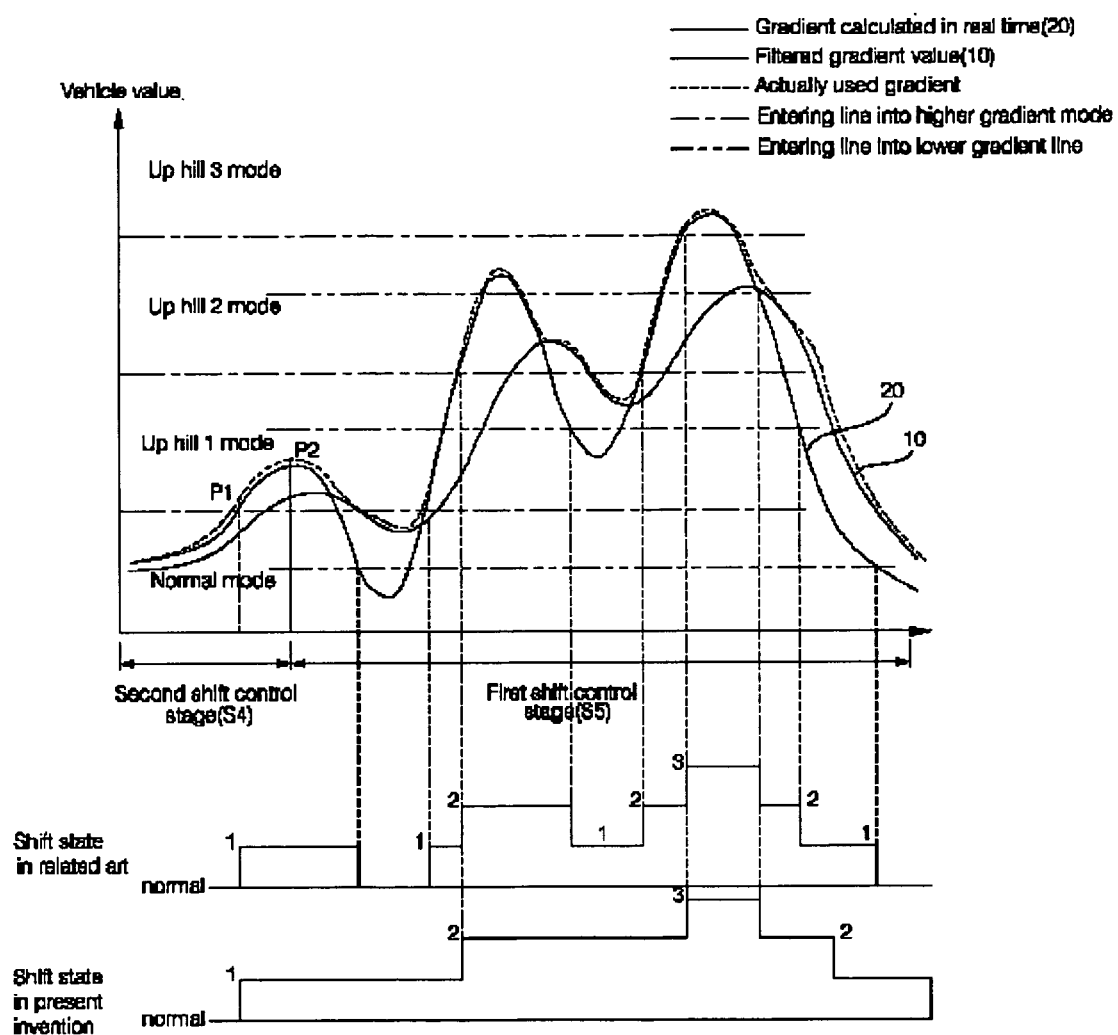
FIG. 2 is a graph showing exemplary gear shifts in accordance with the present invention.

Referring to FIG. 2, when the road changes frequently between uphill and downhill, the line representing the calculated gradients has sharp turns, while the line representing the filtered gradient curves more gently.

In the gradient calculating step, when the gradient has a positive direction (that is, when the vehicle is traveling uphill), a second shift controlling step (S4) takes place, utilizing fuzzy logic. The fuzzy logic determines a shift pattern based on the calculated gradient, throttle opening, and vehicle speed. If the calculated gradient, the throttle opening, and the vehicle speed are greater than pre-set values, the vehicle is up-shifted.

After the second shift controlling step (S4) is performed, whether the road has changed from uphill to downhill is checked occasionally. When the road changes from uphill to downhill, the calculated gradient (S2) is changed to have a negative direction and a first shift controlling step (S5) is performed.

In the first shift controlling step (S5), the calculated gradient and the filtered gradient are compared. Then, fuzzy logic is carried out according to the greater of the gradients. The fuzzy logic is carried out in the same manner as that in the second shift controlling step (S4); however, because the greater gradient is input, the shifting is controlled differently than in the second shift controlling step (S4). Namely, with reference to FIG. 2, the gradient used in the first shift controlling step (S5) is more gently curved than the calculated gradient. Accordingly, the vehicle shifts less often than in the related art.

Meanwhile, once the vehicle gets on a downhill road, even if the downhill road changes to an uphill road, only the first shift controlling step (S5) is used until the road is determined to be sufficiently flat to end step S5. Thus, because the greater gradient is used to control shifting, although the road may frequently change from uphill to downhill or from downhill to uphill, busy shifting is prevented.

As described above, the shift control method of an automatic transmission according to the present invention has advantages in that although the road may frequently change from uphill to downhill or from downhill to uphill, the vehicle does not frequently, so driving comfort and fuel efficiency are improved.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission comprising:
    a step for inputting an opening amount of a throttle and a speed of a vehicle;
    a gradient determining step for determining whether a road has a gradient according to a change in the opening amount of the throttle when an acceleration pedal of the vehicle is depressed;
    a gradient calculating step for calculating the gradient of the road in real time if the road is determined to have the gradient, and outputting a calculated gradient;
    a gradient filtering step for filtering the calculated gradient and outputting a filtered gradient; and
    a first shift controlling step for comparing the calculated gradient to the filtered gradient, outputting a greater gradient, and controlling shifting according to the greater gradient, the opening amount of the throttle, and the speed of the vehicle.

2. The method of claim 1, wherein the first shift controlling step is performed only if the calculated gradient is negative.

3. The method of claim 2, further comprising a second shifting controlling step for controlling shifting according to the calculated gradient if the calculated gradient is positive.

4. The method of claim 3, wherein the first shift controlling step is performed when the calculated gradient changes to negative after the second shift controlling step is performed.

5. The method of claim 1, wherein the gradient filtering step further comprises a step for averaging a plurality of calculated gradients calculated during a predetermined time period.

6. The method of claim 1, wherein the gradient calculating step further comprises a step for calculating the gradient based on a difference between acceleration on a flat road and that on the road.

7. The method of claim 3, wherein the second shift controlling step further comprises a step for inputting a throttle opening and a vehicle speed.

8. The method of claim 7, wherein the second shift controlling step further comprises a step for fuzzy logic that determines a shift pattern based on the calculated gradient, the throttle opening, and the vehicle speed.

* * * * *